United States Patent [19]

Gebben

[11] Patent Number: 4,502,340
[45] Date of Patent: Mar. 5, 1985

[54] TORQUE SENSOR FOR SHAFTS

[75] Inventor: Vernon D. Gebben, Oklahoma City, Okla.

[73] Assignee: International Harvester Company, Chicago, Ill.

[21] Appl. No.: 466,470

[22] Filed: Feb. 15, 1983

[51] Int. Cl.³ .............................................. G01L 3/10
[52] U.S. Cl. .............................. 73/862.33; 73/DIG. 1
[58] Field of Search .......... 73/862.33, 862.59, DIG. 1

[56] References Cited

U.S. PATENT DOCUMENTS

| | | | |
|---|---|---|---|
| 2,737,049 | 3/1956 | Waugh | 73/862.33 |
| 3,800,591 | 4/1974 | Tveter | 73/862.35 |
| 3,813,934 | 6/1974 | Meyer | 73/DIG. 1 X |
| 3,823,608 | 7/1974 | Pantermuehl et al. | 73/862.33 |
| 4,099,411 | 7/1978 | Woolvet et al. | 73/862.08 X |

Primary Examiner—James L. Rowland
Assistant Examiner—Brian R. Tumm
Attorney, Agent, or Firm—Ernest E. Helms; Boris Parad; F. David Au Buchon

[57] ABSTRACT

A non-contacting torque sensor is provided for measuring the torque of stationary and slowly rotating shafts. The torque sensor employs an oscillating thin-wall cylinder to produce a signal whose frequency is directly proportional to the torque applied to a shaft. Electromagnetic coils drive the cylinder at its natural frequency and sense its motion to produce a signal that is proportional to torque. Temperature and shaft bending effects are minimized by accordion folds integrally formed at the end portions of the oscillating cylinder.

12 Claims, 1 Drawing Figure

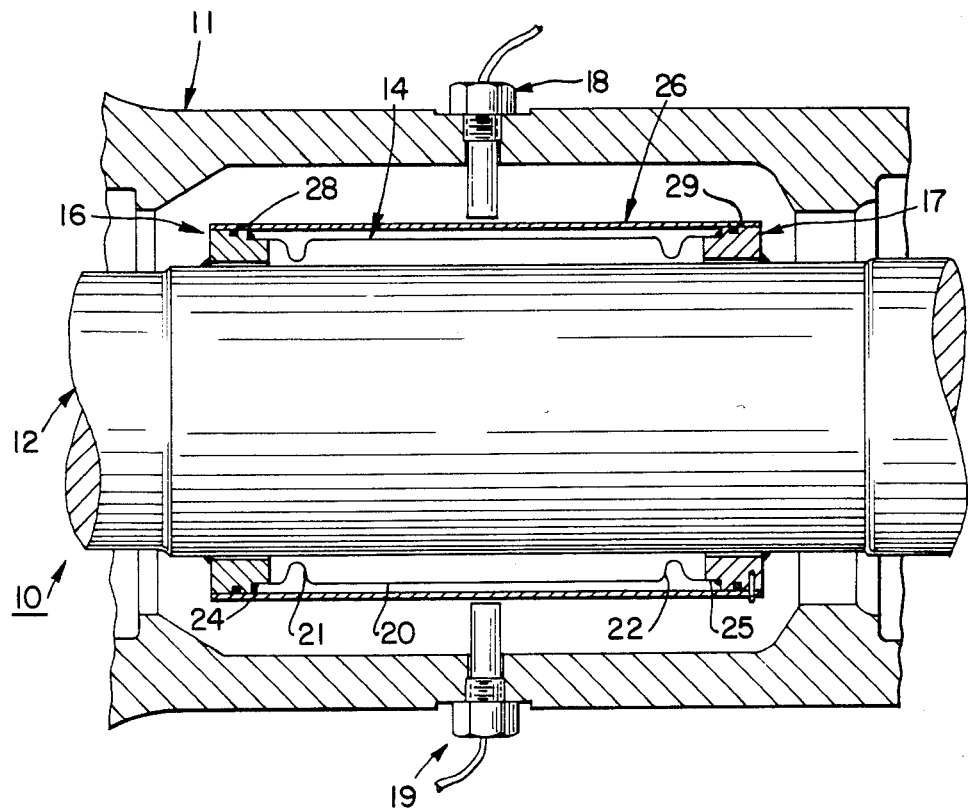

TORQUE SENSOR FOR SHAFTS

BACKGROUND OF THE INVENTION

This invention relates to a torque sensor for producing signals that represent the torque applied to stationary and/or slowly rotating shafts. In particular, this invention is designed to produce a signal representing the axle torque of an off-highway vehicle, such as a farm tractor or crawler tractor.

With the increasing cost of fuel, tractor owners today are interested in obtaining a maximum productivity from their equipment at minimum operating cost. One significant performance indicator of a tractor is its tractive efficiency. Tractive efficiency is defined as the measure of power utilization as the percent of wheel output power being used to pull the implement. Computing its value requires a continuous measurement of axle torque in addition to other signals representing velocities and forces associated with the tractor and implement. This invention describes a torque sensor which could be used for continuously producing a signal that is proportional to the tractor's axle torque.

There are a number of techniques that have been developed using strain gauges and shaft twist measurements for sensing the torque of stationary and rotating shafts. However, most of these sensors are not usable for situations where the shaft speeds are relatively low (i.e. below 100 rpm) and where the environment is severe in vibration, temperature range, and contamination.

The more common type of torque sensors uses strain gauges. These designs have the disadvantage of requiring slip-rings, such as shown in U.S. Pat. No. 4,096,743, to power the sensor elements and to transmit the output signal.

This invention relates in particular to a torque measuring system that employs a thin wall cylinder disposed about the shaft and is driven by electro-magnetic coils for oscillation at its natural frequency. Such a torque measuring system is disclosed in U.S. Pat. No. 4,099,411 which issued to George A. Woolvet. In the Woolvet patent, the frequency of vibration of the thin-wall cylinder varies according to the loading on the cylinder. The frequency of vibration of the cylinder wall depends on the longitudinal strain applied to the cylinder by the loading means.

The longitudinal loading utilized in the Woolvet invention has the benefit of providing higher sensitivity but the disadvantage of responding to shaft bending. The Woolvet invention could not be utilized for measuring the axle torque of any vehicle having high bending loads, such as a farm tractor endures. This invention employs an oscillating thin-wall cylinder arrangement for measuring torque but avoids the shortcomings of the Woolvet invention by employing compensating means for minimizing the temperature and shaft bending effects.

SUMMARY OF THE INVENTION

This invention is directed to a torque measuring apparatus for stationary or slowly rotating shafts which comprises a thin-wall cylinder disposed coaxially along the shaft, mounting means for securing the thin-wall cylinder in a fixed relation to the shaft, resilient means interposed between the ends of the cylinder and the mounting means for minimizing stresses in the axial direction, exciting means for vibrating the thin-wall cylinders, and sensing means for detecting the radial motion of the oscillating cylinder to provide an electrical signal whose frequency is directly proportional to the torque of the shaft.

DESCRIPTION OF DRAWING

For a better understanding of this invention, reference will be made to the accompanying drawing in which the FIGURE shows a cross-sectional view of the preferred embodiment of this invention mounted on a vehicular shaft.

DESCRIPTION OF PREFERRED EMBODIMENT

There is shown in the drawing a partial cross-sectional view of axle housing 10 for a farm tractor in which the axle 12 is rotatably mounted in a conventional manner. A thin-wall steel cylinder 14 is coaxially disposed about the axle 12. The thin-wall cylinder 14 is fastened to the axle 12 in a non-rotating relationship by means of a pair of collar members 16, 17. These collar members 16, 17 are permanently fastened to the axle 12 in a spaced apart relationship such that they retain the ends of the thin-wall cylinder in its coaxial relationship to the axle 12.

A pair of electro-magnetic coils 18, 19 are mounted through the walls of axial housing 11 at diametrically opposite positions and extend inwardly of axial housing wall 11 along the same radial line that extends through the center of axle 12. Coils 18, 19 operate in the same manner as described in the Woolvet U.S. Pat. No. 4,099,411 for the purpose of driving thin-wall cylinder 14 at its natural frequency and for sensing the radial motion of the cylinder 14.

The thin-wall cylinder 14 is preferably constructed of a very thin steel material which is formed into a cylindrical wall member 20 having a wall thicknesses of approximately three thousandths of an inch. Because the axle in an off-road vehicle such as farm tractors is subject to high bending loads, the prior art torque measuring system such as described in the Woolvet patent cannot accurately measure the torque under high bending load conditions. To compensate for the temperature and shaft bending effects on the natural frequency of thin-wall cylinder 14, an accordion-like fold 21, 22 is integrally formed at both circular ends of the cylindrical wall member 20. In the drawing, the accordion-like folds 21, 22 are mounted on the reduced diameter step portion 24, 25 of collar members 16, 17. A plurality of accordion-like folds can be used in place of the singular fold shown in the drawing in the event that further isolation from the shaft bending effects is necessary to thereby stabilize the thin-wall cylinder's 14 natural frequency.

A non-metallic cylindrical shell 26 envelopes the thin-wall cylinder 14 to protect it from the axle's lubricants. A pair of O-rings 28, 29 fit around the collar members 16, 17 respectively to provide a sealing relationship with the ends of the cylindrical shell 26.

In the preferred embodiment, there is shown the pair of coils 18, 19 for driving the thin-wall cylinder 14 with a pulsating magnetic field. If desired, a second pair of coils could be located midway between coils 18, 19 for the purpose of providing stronger excitation. With such an arrangement, the second pair of coils would be pulsed 180° out-of-phase with respect to the first pair of coils 18, 19.

The pair of coils 18, 19 are synchronized with the thin-wall cylinder's natural motion. Synchronization is quite difficult to maintain at high shaft speeds because of a noticeable phase shift occurring between the cylinder motion and the coil pulses. Consequently, the torque sensor of this invention is designed only for use at low speed applications or at a stationary position.

What is claimed is:

1. Apparatus for measuring the torque of a slowly rotating shaft, comprising:
   (a) a thin-wall cylinder disposed coaxially along said shaft,
   (b) a pair of collars, each collar having an inwardly facing reduced diameter step portion and wherein said open ends of said thin-wall cylinders are mounted on said reduced diameter step portion,
   (c) resilient means interposed between said pair of collars and the ends of said cylinder for minimizing stresses in the axial direction,
   (d) shell means for enclosing said thin-wall cylinder and sealing said cylinder from the lubricant for said shaft,
   (e) exciting means for vibrating said thin-wall cylinder, and
   (f) means for sensing the radial motion of the oscillating cylinder to provide an electrical signal whose frequency is directly proportional to the torque of said shaft.

2. Apparatus as defined in claim 1, wherein said resilient means for minimizing stresses in the axial direction comprises at least one accordion-like fold integrally formed at each end of said thin-wall cylinder.

3. Apparatus as defined in claim 1, wherein said shell means comprises a non-metallic cylinder shell surrounding said thin-wall cylinder having its open ends fastened to said pair of collars.

4. Apparatus for measuring the torque of a slowly rotating shaft, comprising:
   (a) a uniform thickness thin-wall cylinder disposed coaxially along said shaft;
   (b) a pair of collars for mounting the ends of said cylinder onto said shaft;
   (c) resilient means interposed between said pair of collars and the ends of said cylinder for minimizing stresses in the axial direction;
   (d) exciting means for vibrating said thin-wall cylinder;
   (e) means for sensing the radial motion of the oscillating cylinder to provide an electrical signal whose frequency is directly proportional to the torque of said shaft; and
   (f) shell means for enclosing said thin-wall cylinder and sealing said cylinder from the lubricant for said shaft.

5. Apparatus as defined in claim 4, wherein said shell means comprises a non-metallic cylindrical shell surrounding said thin-wall cylinder having its open ends fastened to said pair of collars.

6. Apparatus as defined in claim 4, wherein each of said pair of collars have an inwardly facing reduced diameter step portion and wherein said open ends of said thin-wall cylinder are mounted on said reduced diameter step portion.

7. Apparatus as defined in claim 6, wherein said resilient means for minimizing stresses in the axial direction comprises at least one accordion-like fold integrally formed at each end of said thin-wall cylinder.

8. Apparatus for measuring the torque of a slowly rotating shaft comprising:
   (a) a thin-wall cylinder disposed coaxially along said shaft with at least one accordian-like fold formed at each end for minimizing stresses in the axial direction.
   (b) mounting means including a pair of circular collar members each having an inwardly facing reduced-diameter step portion and wherein said end of each of said accordian-like fold is mounted on the respective reduced-diameter step portion,
   (c) shell means for enclosing said thin-wall cylinder and sealing said cylinder from the lubricant for said shaft,
   (d) exciting means for vibrating said thin-wall cylinder, and
   (e) means for sensing the radial motion of the oscillating cylinder to provide an electrical signal whose frequency is directly proportional to the torque of said shaft.

9. Apparatus as defined in claim 8, wherein said housing means comprises a non-metallic cylindrical shell surrounding said thin-wall cylinder having its open ends fastened to said pair of circular collar members.

10. Apparatus for measuring the torque of a slowly rotating shaft comprising:
    (a) a uniform thickness thin-wall cylinder disposed coaxially along said shaft;
    (b) means for mounting the ends of said cylinder in a fixed relationship to said shaft;
    (c) resilient means including at least one accordion-like fold formed at each end of said thin-wall cylinder for minimizing stresses in the axial direction;
    (d) exciting means for vibrating said thin-wall cylinder;
    (e) means for sensing the radial motion of the oscillating cylinder to provide an electrical signal whose frequency is directly proportional to the torque of said shaft; and
    (f) shell means for enclosing said thin-wall cylinder and sealing said cylinder from the lubricant for said shaft.

11. Apparatus as defined in claim 10, wherein said mounting means includes a pair of circular collar members each having an inwardly facing reduced-diameter step portion and wherein said end of each of said accordion-like fold is mounted on the respective reduced-diameter step portion.

12. Apparatus as defined in claim 11, wherein said housing means comprises a non-metallic cylindrical shell surrounding said thin-wall cylinder having its open ends fastened to said pair of circular collar members.

* * * * *